Figure 3:
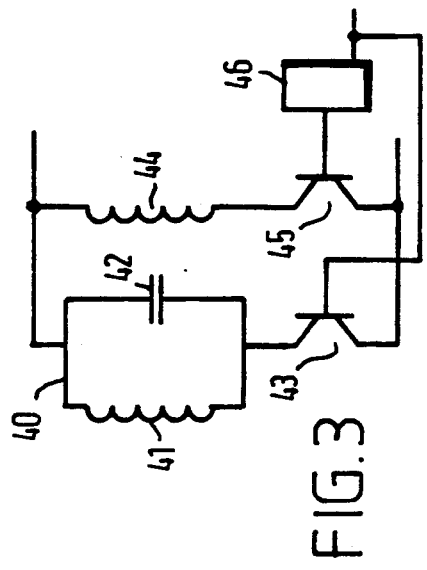

United States Patent [19]
Hogen Esch et al.

[11] Patent Number: 5,103,222
[45] Date of Patent: Apr. 7, 1992

[54] ELECTRONIC IDENTIFICATION SYSTEM

[75] Inventors: Johannes H. L. Hogen Esch, Aalten; Harm J. Kip, Lichtenvoorde, both of Netherlands

[73] Assignee: N.V. Nederlandsche Apparatenfabriek Nedap, De Groenlo, Netherlands

[21] Appl. No.: 213,371

[22] Filed: Jun. 30, 1988

[30] Foreign Application Priority Data

Jul. 3, 1987 [NL] Netherlands .................... 8701565

[51] Int. Cl.$^5$ .................... H04Q 9/00; H04Q 7/00
[52] U.S. Cl. .................... 340/825.54; 340/825.34; 340/572
[58] Field of Search .................... 340/825.34, 825.54, 340/572, 568; 342/44, 51; 235/382, 382.5, 380; 455/188, 134, 63

[56] References Cited

U.S. PATENT DOCUMENTS

| 2,589,331 | 3/1952 | Broos | 455/188 |
|---|---|---|---|
| 4,196,418 | 4/1980 | Kip et al. | 340/825.54 |
| 4,364,043 | 12/1982 | Cole et al. | 340/825.54 |
| 4,473,825 | 9/1984 | Walton | 340/825.34 |
| 4,631,708 | 12/1986 | Wood et al. | 340/825.54 |
| 4,656,463 | 4/1987 | Anders et al. | 340/825.54 |
| 4,786,903 | 11/1988 | Grindahl et al. | 340/825.54 |

FOREIGN PATENT DOCUMENTS

| 3412588 | 4/1984 | Denmark . |
| 0040544 | 5/1981 | European Pat. Off. . |
| 0242906 | 10/1987 | European Pat. Off. . |
| 0287175 | 10/1988 | European Pat. Off. . |
| WO86/01058 | 2/1986 | PCT Int'l Appl. . |
| WO86/04171 | 7/1986 | PCT Int'l Appl. . |
| 2164825 | 9/1984 | United Kingdom . |
| 2163324 | 8/1985 | United Kingdom . |

Primary Examiner—Donald J. Yusko
Assistant Examiner—Edwin C. Holloway, III
Attorney, Agent, or Firm—Fleit, Jacobson, Cohn, Price, Holman & Stern

[57] ABSTRACT

An electronic identification system comprises at least one transmitter capable of generating an interrogation field in an interrogation zone and a plurality of responders capable of generating a pre-determined coded signal in response to an interrogation field. The signal can be detected by at least one receiver. According to the invention, the at least one responder has a receiver circuit adapted to be brought into a first mode in which the receiver circuit forms a tuned narrow-banded circuit and into a second mode in which the receiver circuit forms a broad-banded circuit.

14 Claims, 1 Drawing Sheet

ELECTRONIC IDENTIFICATION SYSTEM

This invention relates to an electronic identification system comprising at least one transmitter which, in an interrogation zone, is capable of generating an electromagnetic interrogation field, and a plurality of responders capable of generating a pre-determined coded signal in response to an interrogation field, which signal can be detected by at least one receiver.

Identification systems of this kind are known in various embodiments. In most cases, the receiver and the transmitter together form a combined unit, called a transmitter/receiver. The known systems can generally be classified in two categories. The first category comprises systems in which the labels or responders can be read from a relatively large distance of, for example, 70 to 80 cm, so-called "hands free." As these systems are often supplied with power from the electromagnetic field of the transmitter, tuned circuits are generally used for transmitting the energy required for the supply of the responder and also for transmitting the information from the responder to the transmitter/receiver system. This restricts the attainable bandwidth of the frequency spectrum and hence the information density. Indeed, in this case the amount of information to be transmitted depends upon the frequency and upon the available time and is, for example, 64 data bits. Some examples of such systems are described in U.S. Pat. No. 4,196,418 and in our Netherland patent application 86,01021.

In the second category of identification systems much more information is required to be transmitted per unit time, as a result of which there is a need to use non-tuned electric circuits for the transmission of both energy and information, so that, at a given frequency, there is a larger spectral bandwidth. An example of such a system is described in our Netherlands patent application 87,00861, in which more than 100 kilobits can be transmitted per second. The latter category of identification systems requires a short distance between the responder and the transmitter/receiver system, because otherwise the required amount of energy cannot be transmitted contactlessly within the energy level of the transmitter permitted by Government regulations.

Practice has shown that there is a need for a possibility of storing in one and the same responder both summary information that can be read from a relatively large distance and more detailed information. The detailed information only requires to be read upon closer inspection, which is not always needed.

It is an object of the present invention to satisfy the need outlined above and, generally, to provide an effective identification system which in a first mode is capable of transmitting a limited amount of data between a transmitter/receiver and a responder from a relatively large reading/writing distance, and in a second mode can transmit a large amount of information between a transmitter/receiver and a responder from a relatively small reading/writing distance.

The present invention accordingly provides an electronic identification system which is characterized in that at least one responder has a receiver circuit adapted to be brought into a first mode in which the receiver circuit forms a tuned, narrow-banded circuit and into a second mode in which the receiver circuit forms a broad-banded circuit.

An identification system of the subject kind could find application in, for example, personal cards, such as passports or medical information cards, in which the information is shifted from central computer data banks to personal information cards, so that the individual in question can determine who is get access to information stored in the card. A portion of the data stored, for example, a personal number or social security number or passport number can then be read from a distance, which would considerably simplify handling at airports, for example, and the remaining part of the data can only be read from a very short reading distance, for example, several centimeters, which requires offering the information carrier to a reading system. Additionally, use could be made of access codes or passwords.

Similarly, medical or other information can be stored on such an information carrier, so that this information is always kept by the individual in question and is not stored in separate computer systems of, for example, hospitals or Government institutions.

Preferably, the responders of a system according to the present invention have a single coil only, which is used in both modes. This makes for optimum miniaturization of the responders.

Figure 2:
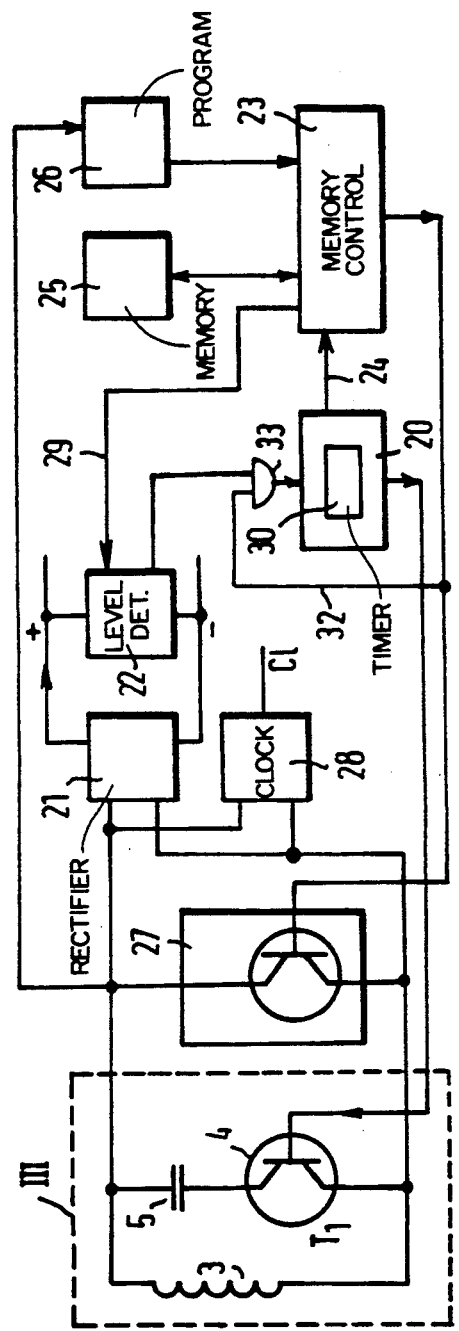

The invention will now be described in more detail with reference to the accompanying diagrammatic drawings. In said drawings, FIG. 1 shows an example of an identification system according to the present invention;

FIG. 2 shows, in greater detail, an example of a responder circuit for an identification system according to the present invention; and FIG. 3 shows a modification of the circuit illustrated in FIG. 2.

Figure 1:
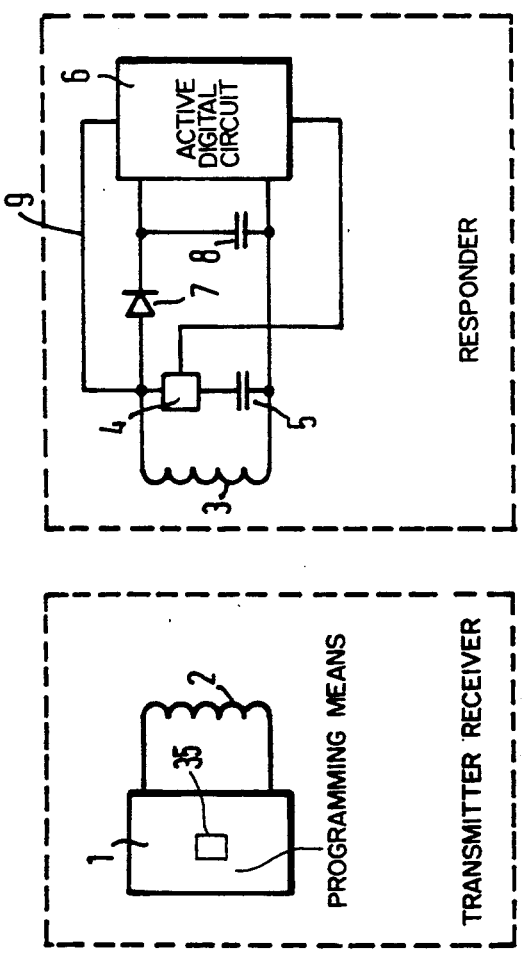

FIG. 1 diagrammatically shows an example of an identification system according to the invention, comprising a transmitter and a receiver combined into a transmitter/receiver 1, which includes a transmitter/receiver coil 2. By means of coil 2, in operation, an interrogation field is generated. FIG. 1 further shows, diagrammatically, a responder functioning as an electronic information carrier, which in response to an interrogation field can generate a pre-determined coded signal. The responder comprises a coil 3 which, according to this invention, by means of a switch element 4, or together with a capacitor 5, can form a relatively narrow-banded tuned circuit, or, uncoupled from the capacitor, can, by itself, form a relatively broad-banded circuit.

In the first case, the switch element 4 forms a through-connection and the responder can operate from a relatively large distance in the manner as described, for example, in U.S. Pat. No. 4,196,418. For simplicity, FIG. 1 does not show the switch needed to affect the electrical properties of the LC circuit 3, 5.

In the second case, the switch element constitutes an interruption or a high resistance. The responder can then only operate at a relatively small distance from the transmitter/receiver, for example, in the manner described in Netherlands patent application 87,00861.

In the mode of the operation of the first case, the responder is only capable of transmitting a relatively small amount of information to the transmitter/receiver within a given time interval.

In the mode of operation of the second case, the responder is capable of transmitting a relatively large amount of information to the transmitter/receiver in the same time interval.

The responder shown in FIG. 1 comprises an active digital circuit 6 which, in this example, receives supply energy through a diode 7 and a buffer capacitor 8 from coil 3. Furthermore, in this example, the active digital circuit can derive clock pulses from the voltage peaks of the A.C. voltage induced in the coil in operation. For this purpose, there is provided a connection 9 between the coil and a clock pulse input of the digital circuit. The digital circuit 6 comprises a memory which may or may not be re-programmable, either in full or in part, a circuit for scanning the memory or any part thereof, and for generating a coded control signal for controlling the switch, not shown in FIG. 1, for affecting the input circuit of the responder, comprising coil 3.

The digital circuit further comprises a switching circuit for controlling the switch element 4. The switching circuit comprises a comparator circuit capable of detecting and field strength in coil 3 and comparting it with a pre-determined threshold value. When the threshold value is exceeded, the system is switched from the tuned mode to the second, non-tuned mode of operation, in which capacitor 5 is uncoupled from coil 3, and a relatively large amount of information can be transmitted at a high rate.

Switching back from the second mode to the first mode is, in principle, effected when the field strength in the coil decreases below the pre-determined value. Preferably, however, a certain hysteresis is observed to prevent the responder from being continuously switched back and forth between the two modes.

Alternatively, the pre-determined threshold value at which the system is switched from one mode to the other can be made dependent upon the mode in which the responder operates. The threshold value can then be lower in the second mode than in the first.

The responder or information carrier is preferably arranged to be at least partly programmable from the outside in a wireless manner.

As the programming of the information carrier or responder, using EEPROMs (Electrical Erasable Programmable Read Only Memory) for the memories, requires more energy than the reading of this information, the programming of the information for transmission in the first mode can be effected in the second mode, for example, via a special code or password. For initiating the writing or programming of information for transmission in the second mode, a code or password can also be used to prevent the inadvertent erasure of information.

Suitable methods of writing information into a responder memory are described in our Netherlands patent applications 86,01021 and 87,00861.

FIG. 2 diagrammatically, but in more detail, shows an example of a circuit of a responder or information carrier, suitable for use in a system according to this invention. The circuit shown again comprises a coil 3 and a capacitor 5, which by means of a controllable switch element 4, which in this example comprises a transistor $T_1$, is or is not connected to the coil. Transistor $T_1$ receives control signals from a mode switching circuit 20. Preferably, transistor $T_1$ is in the conductive state at a low energy level, and the transistor is Hocked if the energy level of the interrogation field exceeds a pre-determined threshold value.

The energy level of the interrogation field can be derived in a simple manner from the level of the D.C. supply voltage for the active circuit of the responder, formed in known manner by a rectifier circuit 21 from the induction voltage appearing across coil 3. In the example shown, therefore, a suitable level detector 22, e.g., a Zener diode, is provided between the output terminals of the rectifier circuit in series with a resistor, to supply a switching signal to the mode switching circuit 20 as soon as the supply voltage exceeds a pre-determined level. Preferably, the mode switching circuit 20 comprises a timer 30 which starts upon receipt of a switching signal from the level detector. After a pre-determined time interval, a switching signal is supplied to switch element 4, provided the supply voltage is still above the threshold value at that moment. If, after the switching of the switch element 4, the supply voltage also remains above the threshold value, a signal is also supplied to a memory control device 23, as indicated by an arrow 24. The parts of the memory 25 associated with the second mode are then accessible for being read or possibly programmed, by means of programming means 35 (FIG. 1). Naturally, in the first, narrow-banded mode, only the memory parts associated with that mode are accessible.

For programming purposes, a programmer device 26 is provided, which is capable of decoding an information carrying signal induced in coil 3 by means of a coding of the interrogation field, and writing the information into the memory via the control device 23.

Furthermore, a modulation switch 27 is provided, which, for example, may be formed by a transistor and, in known manner, under the control of signals provided by the memory control device 23 can be controlled in accordance with the information to be transmitted in the instantaneous mode of operation. In the example shown, the modulation switch device 27 can short-circuit coil 3 in the rhythm of the code signal to be generated.

Finally, at 28, a known per se circuit is shown which can form clock signals CL from the A.C. voltage which, in operation, prevails across coil 3.

It is noted that the level detector is preferably so arranged that switching of the mode of operation also leads to an adaptation of the threshold value to the effect that a higher threshold value is required for switching from the narrow-banded to the broad-banded mode than for switching the other way around. All this is symbolized with an arrow 29.

It is further noted that the switch device causes a sharp drop in voltage across the receiver circuit as soon as the switch device short-circuits the receiver circuit or similarly attenuates or detunes it. In order to prevent that, as a result, mode switching takes place, level detector 22 is put out of operation when switch device 27 receives control signals. FIG. 2 shows this diagrammatically by means of a line 32 connected to the control line 31 of switch device 27 and connected to an AND gate 33 in the connecting line between the level detector and the mode switching circuit.

FIG. 3 diagrammatically shows a variant of the part boxed in broken lines III in FIG. 3. In the embodiment of FIG. 3, there is provided a narrow-banded tuned LC circuit 40 with a coil 41 and a capacitor 42. The tuned LC circuit is series connected with a switch 43. Connected in parallel with this series-circuit is a second series-count comprising a second coil and a second switch 45. Switches 43 and 45 are controlled by control device 23 in such a manner that one switch is closed when the other is open and the other way round. This can be effected in a simple manner by using an inverter 46.

It is true that this embodiment requires two coils in each responder, which may be a disadvantage, but on the other hand, each coil can now be optimally dimensioned with a view to the function of each coil.

In addition to the above-mentioned uses in passports or medical information cards, further utility of the system according to the present invention may be had in access systems, for example, for stadiums, codicil cards, animal recognition labels, identification systems for commodities and related uses.

It is noted that, after reading the foregoing, various modifications will readily occur to those skilled in the art. Thus, for example, the tuned circuit in FIG. 2 may be a series circuit and switch 4 may bridge the capacitor. Such modifications are to be considered as falling within the scope of the present invention.

We claim:

1. An electronic identification system, comprising:
   a transmitter for generating an interrogation field;
   a receiver dfor detecting a coded signal; and
   a responder for transmitting said coded signal in response to the interrogation field;
   said responder comprising:
   a receiver circuit including coil and capacitor means for establishing a tuned mode and a detuned mode and a switch means for selectively switching the receiver circuit between said tuned and detuned modes; and
   an active digital circuit having a memory for storing identifying information; detecting means for detecting the field strength of the interrogation field; and comparing means for comparing the detected field strength with a predetermined value and responsive thereto setting the switch means to switch the receiver circuit to one of said tuned and detuned modes, said receiver circuit in the tuned mode, transmitting a first amount of information from memory during a given time interval and in the detuned mode, transmitting a second substantially larger amount of information from memory during a time interval equal to said given time interval.

2. An identification system as claimed in claim 1, wherein said switch means in said responder is energized to switch the receiver circuit from the tuned mode to the detuned mode and vice versa in a contactless manner.

3. An electronic identification system as claimed in claim 2, wherein the detecting means is a voltage level detector for generating a first signal when the voltage which, in operation, is induced across the receiver circuit exceeds at least a first pre-determined threshold value, and a second signal if the voltage induced across the receiver circuit is below a threshold value.

4. An electronic identification system as claimed in claim 3, wherein the detecting means is connected between the output terminals of a rectifier circuit connected to the receiver circuit.

5. An electronic identification system as claimed in claim 2, wherein the active digital circuit further comprises a timer which is started on receipt of an output signal from the detecting means and after a pre-determined time interval generates an output signal which activates the active digital circuit if at that moment the output signal of the field strength detector is still the same as at the moment the timer was started.

6. An electronic identification system as claimed in claim 2, wherein switching from the first mode to the second mode takes place at a higher field strength than switching from the second mode to the first mode.

7. An electronic identification system as claimed in claim 1, wherein said at least one responder takes the form of an information carrying card.

8. An electronic identification system comprising at least one transmitter for generating an interrogation field in an interrogation zone and a plurality of responders for generating a pre-determined coded signal in response to an interrogation field, and at least one receiver detecting such coded signal, the improvement which comprises the at least one responder has a receiver circuit brought into a first mode in which the receiver circuit forms a tuned, narrow-banded circuit and into a second mode in which the receiver circuit forms a broad-banded circuit, wherein said at least one responder further comprises switching means which in a contactless manner is energized to switch the receiver circuit from the first mode to the second mode and vice versa and a memory with at least one first and one second memory section in which information associated with the relevant responder is stored, and by means of which, in response to an interrogation field, and under the control of memory control means, a coded signal is generated dependent upon the instantaneous mode of the receiver circuit; and wherein the switching means comprise a mode switching circuit for switching the memory control means into a first state associated with the first mode or into a second state associated with the second mode.

9. An electronic identification system as claimed in claim 8, wherein the memory is at least partially re-programmable, said at least one transmitter comprises programming means for modulating the interrogation field with information, and a programming circuit is connected between the receiver circuit and the memory control means, said programming circuit for demodulating a modulated interrogation field, and writing the information obtained after demodulation into the memory under the control of the memory control means.

10. An electronic identification system as claimed in claim 9, wherein the memory control means permits information only to be written into the memory in the second mode.

11. An electronic identification system as claimed in claim 10, wherein at least one pre-determined part of the memory is only accessible, at least for re-programming it, after a pre-determined access code has been supplied to the control means.

12. An electronic identification system comprising at least one transmitter for generating an interrogation field in an interrogation zone and a plurality of responders for generating a pre-determined coded signal in response to an interrogation field, and at least one receiver for detecting such coded signal, the improvement which comprises at least one responder has a receiver circuit brought into a first mode in which the receiver circuit forms a tuned, narrow-banded circuit and into a second mode in which the receiver circuit forms a broad-banded circuit, wherein at least one responder further comprises switching means which in a contactless manner is energized to switch the receiver circuit from the first mode to the second mode and vice versa, wherein the switching means comprise a field strength detector for detecting the strength of the interrogation field at the receiver circuit of the responder and providing an output signal dependent upon the detected field strength, which output signal is supplied to a switching circuit for switching the receiver circuit into the first or second mode, and the field strength detector is a voltage level detector for generating a first signal when the voltage which, in operation, is induced across the receiver circuit exceeds at least a first pre-determined threshold value, and a second signal if the voltage induced across the receiver circuit is below a threshold value, wherein the pre-determined threshold value in the field strength detector is automatically adjustable by the switching means in dependance upon the instantaneous mode.

13. An electronic identification system comprising at least one transmitter for generating an interrogation field in an interrogation zone and a plurality of responders for generating a pre-determined coded signal in response to an interrogation field, and at least one receiver for detecting such coded signal, the improvement which comprises at least one responder has a receiver circuit brought into a first mode in which the receiver circuit forms a tuned, narrow-banded circuit and into a second mode in which the receiver circuit forms a broad-banded circuit, wherein the receiver circuit further comprises a tuned LC circuit which by means of a first controllable switch element is uncoupled from the receiver circuit and a coil which through a second controllable switch element can be uncoupled from the receiver circuit, and that control means are provided which control the first switch element and the second element in opposition to each other.

14. An electronic identification system comprising at least one transmitter for generating an interrogation field in an interrogation zone and a plurality of responders for generating a pre-determined coded signal in response to an interrogation field, and at least one receiver for detecting such coded signal, the improvement which comprises at least one responder has a receiver circuit brought into a first mode in which the receiver circuit forms a tuned, narrow-banded circuit and into a second mode in which the receiver circuit forms a broad-banded circuit, wherein said at least one responder comprises switching means which in a contactless manner is energized to switch the receiver circuit from the first mode to the second mode and vice versa and wherein said at least one responder comprises a controllable modulation switch device for varying the electrical properties of the receiver circuit under the control of control means and in the rhythm of a pre-determined code stored in the responder, and wherein the control means provides a blocking signal for the switching means when the modulation switch is in operation.

* * * * *